United States Patent Office 3,169,933
Patented Feb. 16, 1965

3,169,933
HIGH MOLECULAR WEIGHT POLYPHOSPHO-
NITRILES AND PROCESS OF MAKING SAME
Chui Fan Liu, Ann Arbor, Mich., and Roger L. Evans,
Mendota Heights, Minn., assignors to Minnesota Min-
ing and Manufacturing Company, St. Paul, Minn., a
corporation of Delaware
No Drawing. Filed Aug. 31, 1962, Ser. No. 220,871
12 Claims. (Cl. 260—2)

This invention relates to a new and useful class of high molecular weight phosphonitrilic polymers and to a novel process for their preparation.

Polyphosphonitrilic halides, i.e. chlorides, bromides, iodides and fluorides have long been of interest. The low molecular weight materials, those containing from about 3 to 7 of the basic $PNX_2$ units (X being halogen) are not of great utility per se since they tend to be weak crystalline solids or unstable oils at ordinary temperatures. Very high molecular weight polyphosphonitrilic halides can be produced easily from these low molecular weight materials by heating the latter in vacuo. These high molecular weight materials are rubbery in character but degrade when exposed to water or to moist atmosphere with the result that useful polymeric characteristics are completely lost. The halogen atoms of the low molecular weight materials can also be replaced by various other groups such as alkyl and aryl groups. The resulting substituted materials are crystalline in nature, are soluble in solvents such as benzene and cannot be polymerized like the halides.

It is therefore an object of the present invention to provide a novel and useful class of tough, strong, moldable, high molecular weight phosphonitrilic polymers which are essentially unaffected by water and moist atmosphere. It is another object of the present invention to provide a novel class of high molecular weight-hydrocarbon-substituted polyphosphonitrile plastics. It is still another object of the invention to provide an efficient process for the preparation of the novel polymers of the invention. Other objects of the invention will become apparent to those skilled in the art from reading the specification which follows.

In accord with the above and other objects of the invention a class of solid, high molecular weight, plastic, moldable, light colored, phosphonitrile polymers which are swelled by aromatic hydrocarbon solvents and which are insoluble in all common solvents has been discovered. The skeletal chains of these polymers contain recurring units represented by the formula:

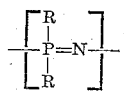

wherein each R represents a hydrocarbon group selected from the class consisting of methyl, ethyl, aryl and lower alkyl-substituted aryl groups, said aryl and lower alkyl-substituted aryl groups containing from six to ten carbon atoms. Among the polymers of the invention are high molecular weight polydimethylphosphonitrile, polydiethylphosphonitrile, polydiphenylphosphonitrile, polydinaphthylphosphonitrile, polyditolylphosphonitrile, polydixylylphosphonitrile, etc. The end groups of these polymers, which are commonly either R or halogen groups, do not substantially affect their properties, in view of the high molecular weights thereof.

The novel polymers of the invention are prepared from high molecular weight polyphosphonitrilic halides without substantial degradation or scission of the skeletal chains thereof. Since the precursor polymers are insoluble in all common solvents which do not react with them chemically, it is not possible to replace the halogen atoms thereof with the hydrocarbon groups using conventional homogeneous reaction systems. It has been found, however, that the halogen atoms on these polymers can be replaced by a heterogeneous reaction in which the polymer remains in the solid state dispersed in a solvent system containing an organo-metallic compound carrying the hydrocarbon group which is to replace the halogen from the polymer.

More specifically, the process of the invention comprises soaking high molecular weight rubbery polyphosphonitrilic halide in a solvent which swells the polymer, dispersing the swelled polymer in an excess of swelling solvent (conveniently using high speed-high shear mixing) into particles ranging from about 10 to 1,000 microns in diameter and reacting the dispersed polymer with an organo-metallic compound having the formula:

$$R_mZ$$ 

wherein R is as previously defined, m is 1-2 and Z is selected from the class consisting of MgX, wherein X is halogen (chlorine, bromine or iodine), sodium, lithium and zinc. When Z is zinc in the foregoing formula, m is 2 and otherwise m is 1. In certain cases, other organo-metallic compounds, such as the dialkylcadmiums and potassium alkyls, may also be used in the process of the invention. The polymers of the invention can be prepared free or essentially free of halogen by the use of a molar excess of the organo-metallic compound. In some cases, however, it is desirable to leave a small percentage of halogen atoms in the polymers to provide sites for crosslinking and/or compounding reactions. At any rate, the molar ratio of R groups to halogen atoms in the polymers of the invention is not less than about 95 to 5. This is important since larger amounts of halogen are deleterious to the stability of the polymers in the presence of water and atmospheric moisture.

The aromatic hydrocarbon solvents such as benzene, toluene, xylene and the like are the preferred swelling solvents since they are easily taken up by the polyphosphonitrilic halide rubber, although they do not react chemically with it or with the polymers of the invention, and since they appear to produce a large degree of swelling action in the polymers. Chlorinated solvents such as chloroform, carbon tetrachloride, trichloroethylene, 1,1,1-trichloroethane and the like as well as ethers such as anisole, diphenyl ether, etc. can also be used.

The polyphosphonitrilic halide rubber is preferably shredded or otherwise broken up prior to adding the swelling solvent in order to increase the area of contact between the bulk of the rubber and the solvent, thereby speeding the swelling process. Mild heating (below or up to the boiling point of the solvent) also facilitates swelling. Ordinarily, sufficient solvent is added to the polymer to swell it to approximately the maximum degree possible but not a great excess over this amount. The maximum swelling takes a finite length of time to accomplish, e.g. frequently as much as several days. In general, greater degrees of swelling aid in the dispersion of the polymeric precursor and, in fact, a polymer which is insufficiently swelled can often be dispersed properly only with great difficulty.

Once the swelling of the polymer has been accomplished a considerable excess of the swelling solvent is added and the mixture is subjected to high speed-high shear mixing forces which effectively break up and disperse the polymeric materials in the solvent as semi-gelatinous particles. The final dispersion ordinarily contains less than about 10 percent by weight of polymer and more than 90 percent by weight of solvent. The mixing is continued until the particles have been reduced to a size range of from about 10 to 1,000 microns. This can be accomplished conveniently on a small scale utilizing a high speed kitchen-model blender ordinarily in from about one to thirty minutes. In larger scale operation, chemical process equipment which accomplishes a similar type of mixing action is used. If larger particle sizes than 1,000 microns are utilized, it has been found that complete replacement of the halide atoms by the hydrocarbon groups generally cannot be achieved. Smaller particle sizes than 10 microns are unnecessary and are relatively difficult to obtain.

The simple organo-metallic reagents, such as organo-lithium, organo-sodium, organo-zinc compounds, etc., are preferred for use in the preparation of the alkyl phosphonitrile polymers of the invention while the Grignard reagents are preferred for use in the preparation of the aryl and alkyl-substituted aryl polymers. The reactions using the simple organo-metallic compounds are smooth and readily effected, but, since toxicity and fire must be guarded against when they are used, the Grignards are preferred in the absence of other considerations. While toxicity and fire are not major problems with the Grignard reagents, undesirable side reactions are encountered when they are used to prepare the alkyl phosphonitrilic polymers. Thus, when an alkyl Grignard reagent is reacted with polyphosphonitrilic chloride in anisole, a relatively large yield of a polyphosphonitrile ester is recovered owing perhaps to the cleaving of the solvent by the Grignard reagent. No such problems are encountered when using the aryl and alkyl-substituted aryl Grignards.

Inert aromatic hydrocarbon or fluorinated solvents of the types used to swell and disperse the polyphosphonitrilic halide rubbers are generally utilized as solvents for the organo-alkali metal, organo-zinc and organo-cadmium compounds while ethereal solvents such as diethyl ether, anisole, diphenyl ether, dipropyl ether, etc. are commonly used with the Grignard reagents. The actual choice of the particular solvent in which the organo-metallic compound is dissolved is not critical, however.

The reaction between the dispersed polymer and the organo-metallic compound is initiated spontaneously upon mixing of the dispersion and the solution. The reaction is preferably carried out in an inert atmosphere, i.e. one which is free of moisture, oxygen and carbon dioxide since these materials tend to react with the reagents. The reaction mixture is preferably agitated during the reaction period which is usually from about 8 to 24 hours although longer or shorter periods may be indicated in some cases. The rate of the reaction is increased by heating, temperatures below the boiling point of the mixture being preferable.

At the end of the reaction period, the agitation is stopped and, if it is desired, the solid product can then be separated from the liquid reaction medium and dried without further treatment. Ordinarily, however, at least most of the non-polymeric starting materials and the by-products of the reaction are removed by several washing cycles. In the first of these, a swelling solvent of the type noted previously is used. In succeeding washes the swelling solvent is diluted with greater and greater proportions of a solvent which tends to contract or shrink the polymer. The shrinking solvents include ketones such as acetone, methylethyl ketone, ethylpropyl ketone and the like and aliphatic or cycloaliphatic hydrocarbons such as hexane, heptane, cyclohexane, etc. At the end of the washing operation, the washing liquid can consist entirely of a shrinking solvent although this is not necessary. Without some contracting during the washing process, however, the highly swelled gelatinous mass is quite difficult to handle, e.g. enormous quantities of solvent are retained by the polymer making it extremely bulky and difficult to filter due to plugging of the filter bed. On the other hand, if only shrinking solvents are used in the washing procedure, impurities may be trapped in the quickly contracted polymer.

The product which remains after the washing-contracting operation is generally a slurry of a finely divided, almost granular solid. Conventional drying techniques can be employed to remove the residual solvents from this material, e.g. evaporation at room temperature and pressure, mild warming at reduced pressure, etc.

The polymers of the invention can be used directly in the form in which they are prepared. Thus the powders resulting from the process of the invention can be molded by conventional pressure molding techniques to form useful shaped plastic articles. (By the term "plastic" as used herein to characterize the novel polymers of the invention is meant tough, strong, horny solids having an elongation at break less than 5 percent as measured at a strain rate of 400 percent per minute in an Instron tensile tester.) These articles can be drilled, tapped, turned in lathes and otherwise worked by known techniques into complex configurations. They are stable with respect to attack by moisture and corrosive chemicals, some even being resistant to attack by aqueous hydrochloric acid. Furthermore, the polymers of the invention are relatively unaffected by high temperatures in that they are able to withstand both short duration heating to quite high temperatures and long term heating at somewhat lower but commonly encountered temperatures without substantial changes in properties. These and other properties of the polymers render them useful as specialty plastic articles of a fire retardant nature, as gasket material where the gaskets will come into contact with certain organic solvents, as electrical insulators, etc. Their utility as electrical insulating materials is enhanced by their having good electrical and fire-retardant properties as well as their stability to heat, atmospheric moisture, etc. It is noted that the light color of the products of the invention (i.e. generally from a cream color to white) is an important advantage in the areas of utility of electrical insulation and specialty plastics since it means that they can be colored as desired. The property of being colorable can even be critical in certain cases for purposes of coding, decoration, etc.

In preparing the polymers of the invention, the completeness of the replacement of halogen atoms by R groups can be determined by analyzing the product polymer for residual halogen. If all of the by-product metal halides (e.g. magnesium chloride, zinc chloride, lithium chloride, magnesium fluoride, etc.) are not removed by washing, it is necessary to analyze the product for the metal also. The difference between these two analytical figures then gives one the amount of halogen remaining unreacted. The polymers of the following examples contain not more than about 5 mole percent of unreacted halogens based on the theoretical halogen content of the polymers being prepared.

EXAMPLE A

High molecular weight polyphosphonitrilic chloride rubber is prepared by polymerizing low molecular weight polyphosphonitrilic chloride. Conveniently, the trimer or tetramer of phosphonitrilic chloride, or a mixture of the two, is heated in an evacuated, sealed vessel at a temperature of about 300° C. until substantially the whole of the white crystalline material has been converted into a rubbery polymer. If desired, small amounts of low molecular weight polymer which may remain are removed by extraction with a solvent such as benzene.

EXAMPLE 1

*The preparation of polydiphenylphosphonitrile*

About 80 grams of polyphosphonitrilic chloride is swelled as far as possible in an excess of anisole, additional anisole is added to bring the total thereof to about 1 liter and the swollen polymer is comminuted into 10–1000 micron particles by dispersing in a kitchen-model high speed blender. A phenyl-magnesium bromide solution in anisole is prepared by reacting 72 grams of magnesium with 480 grams of phenylbromide in diethyl ether, adding 4 liters of anisole and distilling until all of the diethyl ether is removed. The polymeric dispersion and the Grignard solution are charged to a 12 liter reaction flask fitted with a stirrer and the mixture is agitated for 48 hours at about 80° C. under an atmosphere of nitrogen. The resulting rather gelatinous mass is washed by decantation with successive aliquots of anisole-diethyl ether mixtures containing increasing proportions of ether, until no more material is extracted. Pure ether is used finally to remove the anisole. Dilute aqueous hydrochloric acid is used to remove the excess Grignard reagent and inorganic salts. Final washing is with water. The resulting polydiphenylphosphonitrile is then dried conveniently by warming at a pressure of the order of 10 mm. of mercury and is recovered as a white powder of which the infrared spectrum is consistent with the assigned structure. Similar results are obtained when the phenylmagnesium bromide is replaced by phenylmagnesium chloride or phenylmagnesium iodide.

This polymeric powder is pressed into a number of hard, tough, white discs using a pressure of 5 tons per square inch in a 1″ cylindrical mold for varying amounts of time and at varying temperatures and the electrical properties of the resulting discs are measured. The results are as follows:

| Treatment under pressure | Resistance (Ohms) | Resistivity (Ohms/cm.) | Conductivity (Mhos/cm.) |
| --- | --- | --- | --- |
| 5 Min. at 90° C | $4.7 \times 10^{10}$ | $61.7 \times 10^{11}$ | $1.51 \times 10^{-13}$ |
| 10 Min. at 150° C | $3.0 \times 10^{11}$ | $1.0 \times 10^{12}$ | $1.0 \times 10^{-14}$ |

Other shaped articles of the polydiphenylphosphonitrile are prepared by pressing in suitable molds for 5 minutes at 90° C. and at a pressure of about 5 tons per square inch. These articles are unaffected by either prolonged immersion in dilute hydrochloric acid or by heat up to 200° C. and higher.

EXAMPLE 2

*The preparation of polydimethylphosphonitrile*

About 30 grams of polyphosphonitrilic chloride is swelled in xylene sufficiently to allow its being broken into particles and is stirred vigorously in a large excess of xylene until a slurry having a particle size range of from about 10 to 1,000 microns has formed. The polymeric dispersion and 30 ml. of dimethyl zinc in a total of about 1 liter of xylene are charged to a 3 liter reaction flask fitted with a stirrer and the mixture is agitated for about 48 hours at 120° C. in an inert atmosphere, during which time the rubbery polyphosphonitrilic chloride gradually changes into an opaque gelatinous mass. After the reaction has terminated, the mass is washed with aliquots of diethyl ether/benzene mixtures containing increasing proportions of ether until pure ether is being used. The washing is continued until no more materials are extracted and the ether is removed by evaporation. The resulting product, a light powdery solid, has an infrared spectrum which is consistent with polydimethylphosphonitrile.

The polydimethylphosphonitrile powder is converted into hard, tough, light colored fire retardant plastic articles by pressing in molds at about 5 tons per square inch for 5 minutes at 90° C. These articles are essentially unaffected by being heated to 300° C. When suitably shaped, articles formed from this powder by pressure molding techniques are suitable for use as speciality plastic articles of a fire retardant nature, e.g. ash trays, as electrical insulation, etc.

EXAMPLE 3

*The preparation of polydiethylphosphonitrile*

Polydiethylphosphonitrile is prepared in the manner described for the preparation of polydimethylphosponitrile in Example 2, diethyl zinc being used in place of dimethyl zinc.

Shaped articles prepared by pressing the polydiethylphosphonitrile polymer in a suitable mold for 5 minutes at 90° C. are hard and tough, have good electrical properties and are suitable for use as electrical insulators and other similar uses.

EXAMPLE 4

*The preparation of polydinaphthylphosphonitrile*

About 30 grams of high molecular weight of polyphosphonitrilic chloride rubber which has been pre-swelled in xylene and comminuted into 10 to 1000 micron particles is mixed with a molar excess of naphthyl lithium in about 1 liter of xylene. These materials are stirred together under an inert atmosphere at a temperature of 100–120° C. for a period of about 48 hours.

After the reaction has terminated, the mass is washed with aliquots of diethylether/benzene mixtures containing increasing proportions of ether. Washing is continued until no more materials are extracted. Final washing with pure ether shrinks the product to a light powdery solid. Similar results are obtained when naphthyl sodium is used in place of naphthyl lithium.

When all of the solvents has been removed therefrom, small amounts of the polymer powder are pressed in suitable molds under a ram pressure of about 5 tons per square inch for 5 minutes at 90° C. into shaped articles which have good electrical properties and which are highly resistant to water, water vapor, oxygen, and corrosive chemicals and which are useful as electrical insulators, fire-retardant specialty plastic articles and for other similar purposes.

EXAMPLE 5

*The preparation of polydixylyl phosphonitrile*

Polydixylylphosphonitrile is prepared using the process of Example 4, xylyllithium being used in place of naphthyllithium.

What is claimed is:

1. A solid, high molecular weight, plastic, moldable, light colored, phosphonitrile polymer which is swellable by aromatic hydrocarbon solvents and which is insoluble in all common solvents, said polymer consisting essentially of recurring units represented by the formula:

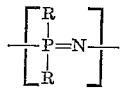

wherein each R is a hydrocarbon group selected from the class consisting of methyl, ethyl, aryl and lower alkyl-substituted aryl groups, said aryl and lower alkyl-substituted aryl groups containing from 6 to 10 carbon atoms.

2. The solid, high molecular weight, plastic, moldable, light colored phosphonitrile polymer of claim 1 wherein each R is phenyl.

3. The solid, high molecular weight, plastic, moldable, light colored phosphonitrile polymer of claim 1 wherein each R is methyl.

4. The solid, high molecular weight, plastic, moldable, light colored phosphonitrile polymer of claim 1 wherein each R is ethyl.

5. The solid, high molecular weight, plastic, moldable, light colored phosphonitrile polymer of claim 1 wherein in each R is naphthyl.

6. The solid, high molecular weight, plastic, moldable, light colored phosphonitrile polymer of claim 1 wherein each R is xylyl.

7. The process for producing a solid, high molecular weight, plastic, moldable, light colored, phosphonitrile polymer which is swellable by aromatic hydrocarbon solvents and which is insoluble in all common solvents which comprises soaking a high molecular weight rubbery polyphosphonitrilic halide in a solvent which swells the polymer, dispersing the swelled polymer in an excess of swelling solvent as particles ranging from about 10 to 1000 microns in diameter and reacting the dispersed polymer with an organo-metallic compound having the formula:

$$R_mZ$$

wherein R is selected from the class consisting of methyl, ethyl, aryl and lower alkyl-substituted aryl groups, said aryl and lower alkyl-substituted aryl groups containing from 6 to 10 carbon atoms, $m$ is 1–2 and Z is selected from the class consisting of MgCl, MgBr, MgI, sodium, lithium and zinc, provided that when Z is zinc, $m$ is 2 and that $m$ is otherwise 1.

8. The process of claim 7 wherein said polyphosphonitrilic polymer is polydiphenylphosphonitrile.

9. The process of claim 7 wherein said polyphosphonitrilic polymer is polydimethylphosphonitrile.

10. The process of claim 7 wherein said polyphosphonitrilic polymer is polydiethylphosphonitrile.

11. The process of claim 7 wherein said polyphosphonitrilic polymer is polydinaphthylphosphonitrile.

12. The process of claim 7 wherein said polyphosphonitrilic polymer is polydixylylphosphonitrile.

References Cited in the file of this patent
UNITED STATES PATENTS 2,192,921    Lipkin _____ Mar. 12, 1940
3,065,266    Tesi et al. _____ Nov. 20, 1962

OTHER REFERENCES

Becke-Goehring et al.: Zeitschrift für anorganische und allgemeine Chemie. Band 304, May 1960, pp. 126–136.

Paddock: Research applied in Industry, vol. XIII, No. 3, pp. 94–100, March 1960.